(12) United States Patent
Ue et al.

(10) Patent No.: US 6,217,237 B1
(45) Date of Patent: Apr. 17, 2001

(54) SPOOL CASE UNIT FOR CAMERA AND CAMERA INCLUDING SUCH SPOOL CASE UNIT

(75) Inventors: Takaaki Ue, Hachioji; Hiroshi Terada, Mitaka; Tetsuya Takagi, Akiruno; Tokuo Shimizu, Hachioji, all of (JP)

(73) Assignee: Olympus Optical Co., Ltd., Tokyo (JP)

( * ) Notice: Subject to any disclaimer, the term of this patent is extended or adjusted under 35 U.S.C. 154(b) by 0 days.

(21) Appl. No.: 09/327,779

(22) Filed: Jun. 7, 1999

(30) Foreign Application Priority Data

Jun. 11, 1998 (JP) .................................................. 10-163662
Aug. 6, 1998 (JP) .................................................. 10-223191

(51) Int. Cl.$^7$ .................................................. G03B 17/00
(52) U.S. Cl. ........................... 396/440; 396/538; 396/541
(58) Field of Search ..................... 396/439, 440, 396/511, 513, 516, 534, 538, 541

(56) References Cited

U.S. PATENT DOCUMENTS

| 4,440,483 | * | 4/1984 | Linke et al. | 396/415 |
| 5,826,123 | * | 10/1998 | Lai | 396/446 |
| 5,842,048 | * | 11/1998 | Zander | 396/6 |
| 5,867,745 | * | 2/1999 | Balling | 396/511 |
| 6,006,044 | * | 12/1999 | Okuno | 396/538 |

FOREIGN PATENT DOCUMENTS

| 4-340529 | 11/1992 | (JP) . |
| 7-20565 | 1/1995 | (JP) . |

* cited by examiner

Primary Examiner—David M. Gray
(74) Attorney, Agent, or Firm—Frishauf, Holtz, Goodman, Langer & Chick, P.C.

(57) ABSTRACT

A spool case unit has a paired end walls arranged in both end sides of a film to be wound up onto a spool shaft in its width direction, a connecting member provided between the end walls so as to connect the end walls to each other, and facing a portion of an outer circumferential surface of the film on the spool shaft, and an elastic thin plate cooperating with the connecting member between the end walls to form a side wall for the spool case unit and to surround the outer circumferential surface of the film on the spool shaft, the thin plate having an area larger than that of the connecting member in the side wall. A camera using the spool case unit, includes a lens barrel unit, a cartridge case unit, the spool case unit, and a photographing opening unit to which the cartridge case unit and the spool case unit are connected. The opening unit has a photographing opening through which a light beam from the lens barrel unit passes and to which a film withdrawn from a film cartridge in the cartridge case unit towards the spool shaft in the spool case unit, crosses. The opening unit further has film guide rails for determining a position of the film to the photographing opining.

7 Claims, 5 Drawing Sheets

SPOOL CASE UNIT FOR CAMERA AND CAMERA INCLUDING SUCH SPOOL CASE UNIT

BACKGROUND OF THE INVENTION

The present invention relates to a spool case unit which is provided for a camera using a long and narrow film, the spool case having a spool shaft housed therein for winding the film loaded from outside into the camera, and a camera having such a spool case unit.

In connection with the conventional spool case unit, the main structural elements are formed of a metal or synthetic resin material, as an integral unit, together with the frame of the camera which uses the spool case unit, by injection molding.

Recently, there is a great demand for the reduction of the size of the external dimension of the camera and its weight. However, with the conventional spool case unit which includes the main structural elements formed integrally with the frame of the camera as described above, it is very difficult to satisfy the above described demand. More specifically, there is a limitation in reducing the thickness of the main structural elements, under consideration of the flow of the molten metal or synthetic resin during the injection molding process. In order to reduce the external dimension of the camera and its weight further than the present level, the conventional method of manufacturing a spool case unit, must be changed.

Jpn. Pat. Appln. KOKAI Publication No. 7-20565 discloses a technique in which a part of the side wall of the outer shell, the shell being a main structural element of the spool case unit, is made of an elastic thin plate. The part of the side wall is located adjacent to the lens barrel of the camera. This structure makes it possible to place the spool case unit slightly closer to the lens barrel than in the conventional camera, and contributes to the slight reduction of the weight of the spool case unit.

Jpn. Pat. Appln. KOKAI Publication No. 4-340529 discloses a structure in which a motor is placed within the spool shaft of the spool case unit in order to reduce the size of the camera. According to the structure disclosed in this publication, the outer shell of the spool case unit is composed of two-divided upper and lower halves. In order to assemble the spool case unit, the motor is fixed with screws at a predetermined position in the upper half of the outer shell of the spool case unit, and then the lower half of the outer shell is fixed to the upper half while the center hole of the spool is rotatably fitted on the circumference of the motor. Thus, the structure of the spool case unit disclosed in Jpn. Pat. Appln. KOKAI Publication No. 4-340529 makes an assembly of the camera complicate. Further, this structure does not exhibit any weight reducing technique.

This invention is derived from the above described circumstances, and an object of the present invention is to provide a spool case unit for a camera, which has a simple structure, can be easily assembled, and enables a reduction of the external dimension of the camera and its weight, as well as a camera which includes the above described spool case unit.

BRIEF SUMMARY OF THE INVENTION

In order to achieve the above-described object, a spool case unit for a camera using a long and narrow film, which is according to the present invention, and which is located adjacent to a lens barrel of the camera, and houses a spool shaft for winding up the film loaded into the camera from outside, the spool case unit comprising:

a pair of end walls which are arranged in both end sides of the film to be wound up onto the spool shaft in a width direction of the film;

a connecting member which is provided between the pair of end walls, connects the pair of end walls to each other, and faces a portion of an outer circumferential surface of the film wound up onto the spool shaft; and an elastic thin plate which is composed of a thin plate having elasticity, and cooperates with the connecting member so that a side wall for the spool case unit is formed between the pair of end walls, the side wall surrounding the outer circumferential surface of the film wound onto the spool shaft, and an area of the thin plate being larger than that of the connecting member in the side wall.

In the spool case unit for a camera, according to the present invention and structured as described above, the connecting member and the elastic thin film cooperate to surround the outer circumferential surface of the film wound onto the spool shaft between the pair of end walls, and form a side wall for a spool case unit between the pair of the end walls. The elastic thin plate has an area larger than that of the connecting member in the side wall.

The elastic thin plate having a film surrounding area larger than that of the connecting member, promotes the lightening of the weight of the spool case unit and further that of the camera which uses the spool case unit.

The elastic thin plate reduces the external dimension of the portion of the side wall, the portion being constituted by the elastic thin plate in the spool case unit. Therefore, the elastic thin plate having a film surrounding area larger than that of the connecting member significantly reduces the external dimension of the outer circumferential surface of the side wall in the spool case unit. Further, the external dimension of the camera which uses the spool case unit can be significantly reduced.

In the spool case unit for a camera, according to the present invention, it is preferable that the elastic thin film is made of a metal or a synthetic resin having a light shielding property.

The elastic thin film preferably has an electric conductivity, and is grounded when the spool case unit for a camera, according to the present invention, is set onto the camera.

With this structure, even if the film wound onto the spool shaft of the spool case unit generates static electricity due to friction, the static electricity can be discharged via the elastic thin plate. Therefore, attachment of dusts onto the film or various members in the spool case unit, caused by the static electricity, can be prevented, and further possible damages caused to the film as it moves and rubs against the dusts in the spool case unit can be prevented.

The elastic thin film is preferably composed of a single material, and is fixed to the connecting member. This structure makes the structure of the spool case unit being simple, and accordingly, the assembly work for the spool case unit can be facilitated.

The elastic thin plate is so preferably structured that it generates an urging force directing inwards in the radial direction of the spool shaft between the pair of the end walls, and makes the urging force act onto the pair of the end walls so that the positioning of the thin plate around the outer circumferential surface of the film on the spool shaft between the pair of the end walls is carried out. This structure also makes the structure of the spool case unit being simple, and the assembly work for the spool case unit also can be facilitated.

In order to achieve the above-described object of the present invention, another spool case unit for a camera, according to the present invention, is located adjacent to a lens barrel of the camera, the camera using a long and narrow, and houses a spool shaft for winding up a film loaded into the camera from outside, the spool case unit comprising:

a pair of end walls which are arranged in both end sides of the film to be wound up onto the spool shaft in a width direction of the film;

a connecting member which is provided adjacent to the lens barrel, connects the pair of end walls to each other, and faces a portion of an outer circumferential surface of the film wound up onto the spool shaft; and an elastic thin plate which is composed of a thin plate having elasticity, and cooperates with the connecting member so that a side wall for the spool case unit is formed between the pair of end walls, the side wall surrounding the outer circumferential surface of the film wound onto the spool shaft, and an area of the thin plate being larger than that of the connecting member in the side wall.

With such another spool case unit for a camera, according to the present invention and structured as described above, similar effects to those of the before-described spool case unit for a camera according to the present invention, can be obtained.

In such another spool case unit for a came, the connecting member has an opening which faces the outer circumferential surface of the lens barrel, and the elastic thin plate covers the opening.

The connecting member which connects the pair of the end walls to each other in this spool case unit for a camera, is thicker than the elastic thin plate. Therefore, by forming the opening in the connecting member so that the opening faces the outer circumferential surface of the lens barrel and by covering the opening with the elastic thin plate, the spool case unit can be located further close to the lens barrel in the camera. As a result of this, the external dimension of the spool case unit around the outer circumferential surface of the film can be further significantly reduced, and therefore the external dimension of the camera which uses this spool case unit can be further significantly reduced.

Further more, a camera having a spool case unit, according to the present invention, comprising:

a lens barrel unit having a lens barrel;

a cartridge case unit having a cartridge case to which a film cartridge is loaded from outside;

a spool case unit having a spool case in which a spool shaft for winding up a film therearound, is housed; and a photographing opening unit to which the cartridge case unit and the spool case unit are connected, and which has a photographing opening thorough which a light beam from the lens barrel passes and on which the film withdrawn from the film cartridge in the cartridge case of the cartridge case towards the spool shaft in the spool case of the spool case unit passes, and a film guide means for determining a position of the film with respect to the photographing opening;

the spool case unit including:

a pair of end walls which are arranged in both end sides of the film to be wound up onto the spool shaft in a width direction of the film;

a connecting member which is provided between the pair of end walls, connects the pair of end walls to each other, and faces a portion of an outer circumferential surface of the film wound up onto the spool shaft; and an elastic thin plate which is composed of a thin plate having elasticity, and cooperates with the connecting member so that a side wall for the spool case unit is formed between the pair of end walls, the side wall surrounding the outer circumferential surface of the film wound onto the spool shaft, and an area of the thin plate being larger than that of the connecting member in the side wall.

Further, in order to achieve the object of the present invention, a still another spool case unit for a camera, according to the present invention, comprising:

a spool shaft for winding up a film thereonto; and a thin plate which is made of a single material having a flexibility and a light shielding property, and surrounds the spool shaft with a gap interposed therebetween, excepting for an opening for loading/unloading a film to/form the spool shaft from/to outside.

In such a still another spool case unit for a camera, according to the present invention and having the above-described structure, the spool shaft is surrounded by the single thin plate having a flexibility and a light shielding property, excepting the opening for loading and unloading a film to and from the spool shaft from and to outside. Therefore, a reduction in the dimension of a portion of the spool case unit, the portion being constituted by the thin plate, in the radial direction of the spool shaft, can be promoted. Further, the structure of the above-described portion is simplified, and the weight thereof is reduced. Further, the assembly work thereof is facilitated.

In all of the above described spool case units for cameras, according to the present invention, it is preferable that the thin plate is made of a metal, and more preferably, the metal is a steel.

The still another spool case unit for a camera, according to the present invention, preferably includes a unit main body having a bearing portion for supporting the spool shaft rotatably, and the unit main body has an engagement member which engages with the thin plate to hold the thin plate.

The still another spool case unit for a camera, according to the present invention, is preferably prepared independent of the other units of the camera which has this spool case unit, and be fixed to any of the other units.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

An embodiment of the camera which uses the spool case unit according to the present invention will now be described in detail with reference to accompanying drawings.

DETAILED DESCRIPTION OF THE INVENTION

Figure 1:
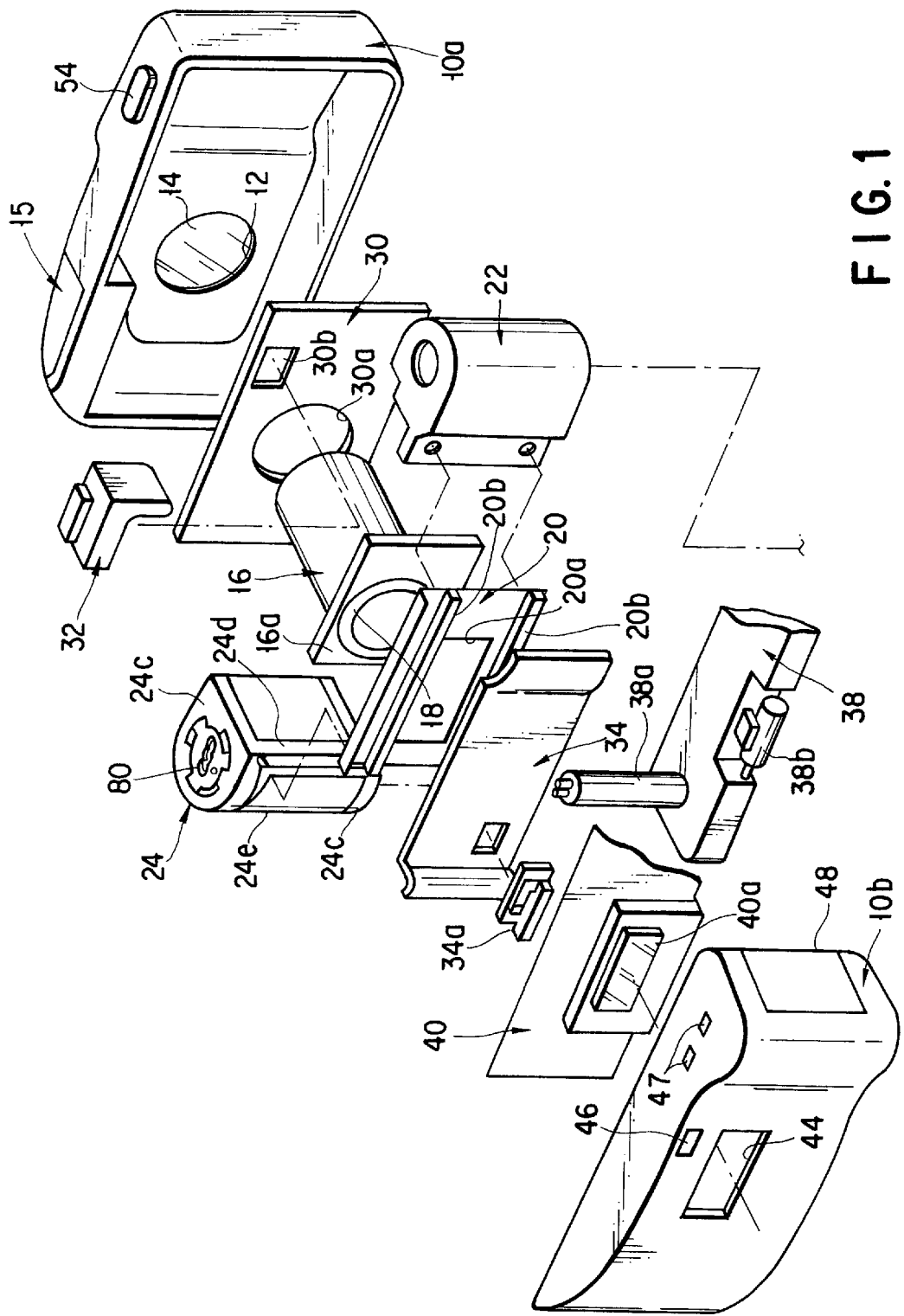
FIG. 1 is an exploded perspective view schematically showing an embodiment of a camera which uses a spool case unit according to the present invention, when viewed obliquely from above and behind on a right-hand side.

At first, an entire structure of the embodiment of the camera which uses the spool case unit according to the present invention will now be described in detail with reference to FIGS. 1 and 2.

An outer housing of the camera includes a front cover unit 10a and a back cover unit 10b. At the substantial center of the front surface of the front cover unit 10a, a lens barrel projecting/retracting opening 12 is formed. The front surface further has a barrier member 14 thereon provided thereon to be movable between a close position in which the barrier member 14 covers the lens barrel projecting/retracting opening 12 and an open position in which the barrier member 14 is moved in a rightward direction from the close position along the front surface and the lens barrel projecting/retracting opening 12 is opened. (Note, in the description of the embodiment, the up and down, and right and left directions are determined with reference to the case where the camera is viewed from behind).

At the upper left corner of the front surface of the cover unit 10a, an electric flash unit 15 is provided.

In a space surrounded by the front cover unit 10a and the back cover unit 10b, a lens barrel unit 16 is placed to face the lens barrel projecting/retracting opening 12 of the front cover unit 10a. The lens barrel unit 16 is fixed to the front surface of a rail plate unit 20 while a ring-shaped light shielding member 18 having elasticity is arranged between a lens barrel support plate 16a located at the proximal end of the lens barrel unit 16 and the rail plate unit 20.

In the rail plate unit 20, a picture size defining window 20a is made to face the lens barrel unit 16. To the front surface of the rail plate unit 20, a mask plate unit is fixed. The mask plate unit is arranged in the picture size defining window 20a and serves as a picture size defining gate. It should be noted that since the mask plate unit is so thin that it is difficult to illustrate clearly, it is omitted in FIGS. 1 and 2.

On the back surface of the rail plate unit 20, a pair of film rails 20b are formed so that the rails 20b extend in parallel to each other in a horizontal (left-right) direction while one rail is located above the picture size defining window 20a and the other is below the window 20a.

At the left and right ends of the rail plate unit 20, a film cartridge unit 22 and a spool unit 24 are fixed. The film cartridge unit 22 constitutes a film cartridge case, and the spool unit 24 constitutes a spool case.

In the lower surface of the film cartridge unit 22, a film cartridge load/unload opening is formed, and in a portion of the lower surface of the back cover unit 10b, the portion corresponding to the film cartridge load/unload opening of the film cartridge unit 22, a film cartridge load/unload lid (not shown) is provided to be movable between an open position and a close position.

The film cartridge used in the camera of the embodiment is a so-called new film cartridge (IX240 cartridge). However, the film cartridge case of the film cartridge unit and the spool case of the spool unit of the camera of the present invention, can be arranged to accept various types of long and narrow films including a 35-mm film, which are conventionally widely used.

Figure 2:
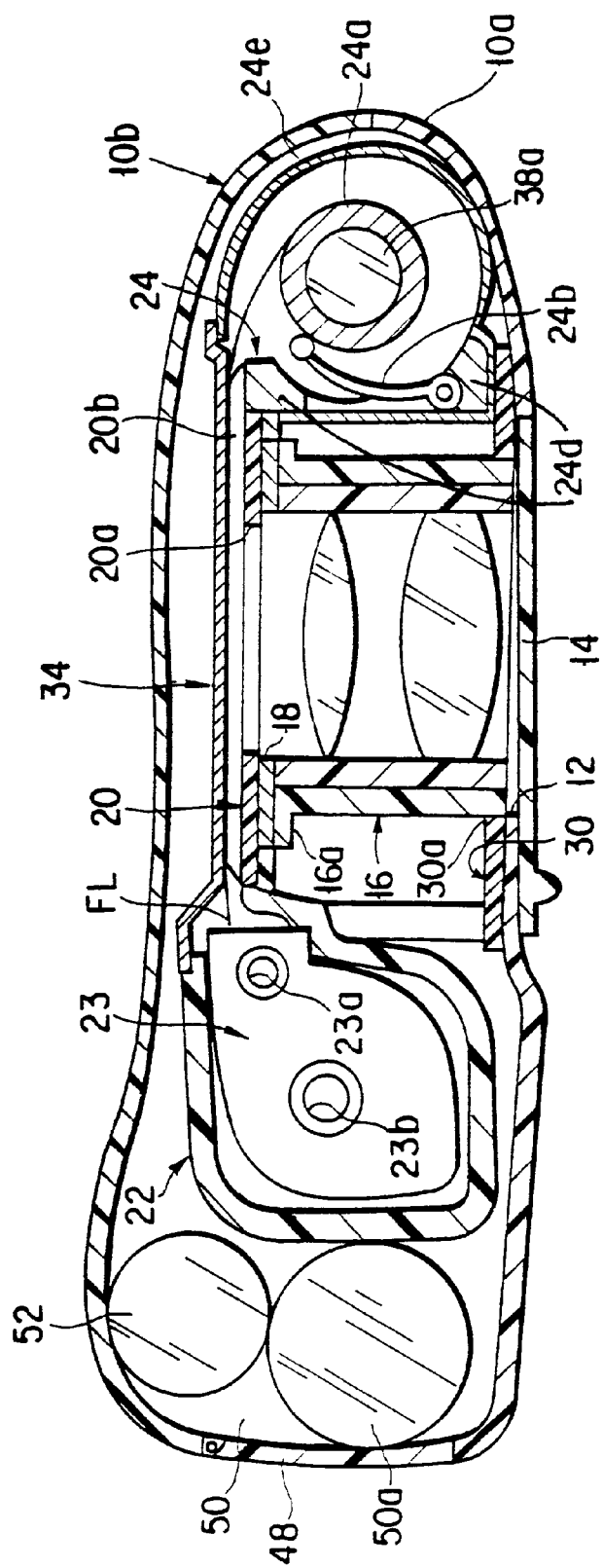
FIG. 2 is a horizontal cross sectional view schematically illustrating the camera shown in FIG. 1.

FIG. 2 shows a new film cartridge 23 housed in the film cartridge case of the film cartridge unit 22.

In the spool case of the spool unit 24, a hollow spool shaft 24a is housed to be rotatable. At a portion of the side wall of the spool case, the portion being adjacent to the lens barrel unit 16, a film pressing piece 24b is provided to be swingable in the radial direction of the spool shaft 24a. The film pressing piece 24b is urged towards the outer circumferential surface of the spool shaft 24a by urging means which is not shown. The film pressing piece 24b is used to automatically wind up the film onto the spool shaft 24a.

In this embodiment, the spool unit 24 includes a pair of end walls 24c located both sides (up and down direction in FIG. 1) of a film in its width direction, the film being wound onto the spool shaft 24a, and a connecting member 24d located adjacent to the lens barrel unit 16, and connecting the pair of the end walls 24c to each other. The connecting member 24d extends between the pair of the end walls 24c in the longitudinal direction of the spool shaft 24a, and faces a part of the outer circumferential surface of the spool shaft 24a.

The spool unit 24 further includes an elastically deformable thin plate 24e having a light shielding property. The thin plate 24 is located between the pair of the end walls 24c and cooperates with the connecting member 24b to surround the outer circumferential surface of the spool shaft 24a. That is, the connecting member 24d and the thin plate 24e constitute a side wall which surrounds the outer circumferential surface of the spool shaft 24a between the pair of the end walls 24c in the spool unit 24. Further, in the side wall, the thin plate 24e has an area larger than that of the connecting member 24d.

In the embodiment, in the upper end wall 24c of the spool unit 24, an open/close lid 80 for loading/unloading the spool shaft 24a to/from the spool case surrounded by the pair of the end walls 24c, the connecting member 24d and the thin plate 24e, is provided.

The structure of the spool unit 24 will be explained in detail later.

To the front surface of the film cartridge unit 22 and the front surface of the spool unit 24, both units 22 and 24 being fixed to the right and left end portions of the front surface of the rail plate unit 20, a reinforcement plate unit 30 is fixed. In a portion of the reinforcement plate 30, the portion corresponding to the lens barrel unit 16, a lens barrel insertion opening 30a is formed, and at the upper right corner of the reinforcement plate 30, a range finding opening 30b is formed. The range finding opening 30b of the reinforcement plate unit 30 corresponds to a range finding window (not shown) provided at the upper right corner of the front wall of the front cover unit 10a. To the back surface of the reinforcement plate unit 30, an auto-focusing and view finder control unit 32 is fixed.

To the rear surface of the film cartridge unit 22 and the rear surface of the spool unit 24, both units 22 and 24 being fixed to the right and left end portions of the front surface of the rail plate unit 20, a pressure plate unit 34 is fixed. The press plate unit 34 cooperates with the rail plate unit 20 to slidably hold a new film FL while it is sent out of the new film cartridge 23 in the film cartridge unit 22 and passes on the back surface of the rail plate unit 20 between the pair of the rail members 20b toward the spool case of the spool unit 24, onto the back surface of the rail plate unit 20 between the pair of the rail members 20b. By holding the film FL on the back surface of the rail plate unit 20 between the pair of rail members 20b with the pressure plate 24, the new film FL is placed on a film standard surface to the lens barrel unit 16.

In this embodiment, since the new film cartridge 23 is used, a magnetic head 34a for recording magnetic data on a magnetic recording track (not shown) provided along the lower edge of the new film is provided at the lower left corner of the pressure plate unit 34.

The film cartridge unit 22 and the spool unit 24 integrated by the rail plate unit 20 and the reinforcement plate unit 30 as described above, are connected onto a motor drive unit 38. The motor drive unit 38 includes a motor 38a inserted into the central hole of the spool shaft 24a of the spool unit 24, a rotational force transmission means (not shown) having, for example, a gear train, for transmitting the rotational force generated from the motor 38a selectively to a plurality of predetermined portions, and a plunger-solenoid assembly 38b for switching the portion to which the rotational force is transmitted by the rotational force transmission means to another among a plurality of predetermined portions.

In the embodiment, the rotational force transmission means (not shown) is connected to the spool shaft 24a of the spool unit 24, a rotation center shaft 23a of a film exit open/close door of the new film cartridge 23 and a film cartridge shaft 23b of the new film cartridge 23 in the film cartridge case of the film cartridge unit 22. The rotational force transmission means (not shown) selectively carries out an opening/closing of the film exit door, a sending out of the new film from the new film cartridge 23, and a rewinding up of the new film into the new film cartridge 23.

In the space surrounded by the front and back cover units 10a and 10b of the outer housing, a flexible plate unit 40 is placed at the back of the pressure plate unit 34. On the flexible plate unit 40, an electrical control circuit for the camera of the embodiment is formed. The flexible plate unit 40 extends from the back of the pressure plate unit 34 towards the above of the lens barrel unit 16, that of the film cartridge unit 22 and that of the spool unit 24, these units 16, 22 and 24 being fixed to the center, right end and left end portions of the front surface of the rail plate unit 20.

The flexible plate unit 40 includes a liquid crystal display device 40a at a portion thereof located behind the pressure plate unit 34. The liquid crystal display device 40a is placed in a liquid crystal display window 44 formed in the rear wall of the back cover unit 10b.

On the rear wall of the back cover unit 10b, a finder eye piece window 46 is formed. In the space surrounded by the front cover unit 10a and the back cover unit 10b of the outer housing, a finder unit (not shown) is further provided between the finder eye piece window 46 of the back cover unit 10b and a finder objective window (not shown) formed adjacent to the before-mentioned range finding window (not shown) formed at the upper right corner of the front wall of the front cover unit 10a.

On the upper wall of the back cover unit 10b, various mode switching buttons 47 are provided to correspond to various mode selecting switches (not shown) arranged in the upper extending portion of the flexible plate unit 40.

A battery case open/close lid 48 is provided in the right wall of the back cover unit 10b. With the battery case open/close lid 48, a battery 50a can be loaded to and unloaded from the battery case formed between the film cartridge unit 22 and the battery case open/close lid 48 in the internal space of the back cover unit 10b.

In the internal space of the back cover unit 10b, a capacitor 52 for the flash unit 15 of the front cover unit 10a is provided in the back side of the battery case 50.

In the upper wall of the front cover unit 10a, a shutter button 54 is provided to correspond to a shutter switch (not shown) arranged on the upper extending portion of the flexible plate unit 40.

The camera of the embodiment is constituted by combining a plurality of units with each other, the units including the front cover unit 10a, the back cover unit 10b, the flash unit 15, the lens barrel unit 16, the rail plate unit 20, the film cartridge unit 22, the spool unit 24, the reinforcement plate unit 30, the auto-focus and finder control unit 32, the pressure plate unit 34, the motor drive unit 38, the flexible plate unit 40 and the mask plate unit, which are pre-assembled independently from each other.

With the above descried structure of the camera, in a case where another camera of a different type from that of the camera of the embodiment, is to be manufactured, any units in these units of the camera of the embodiment, which are commonly usable for this different type of camera can be used for it. Therefore, since this different type of camera can be manufactured by only preparing a unit or units other than the commonly usable units, the different type camera can be easily manufactured at low cost. Thus, since a plurality of types of cameras can be manufactured by using commonly usable units, they can be placed quickly on the market at low cost.

Next, the internal structure of the above described camera and the structure of the spool case will now be explained in detail with reference to FIGS. 3, 4A, 4B and 5.

Figure 3:
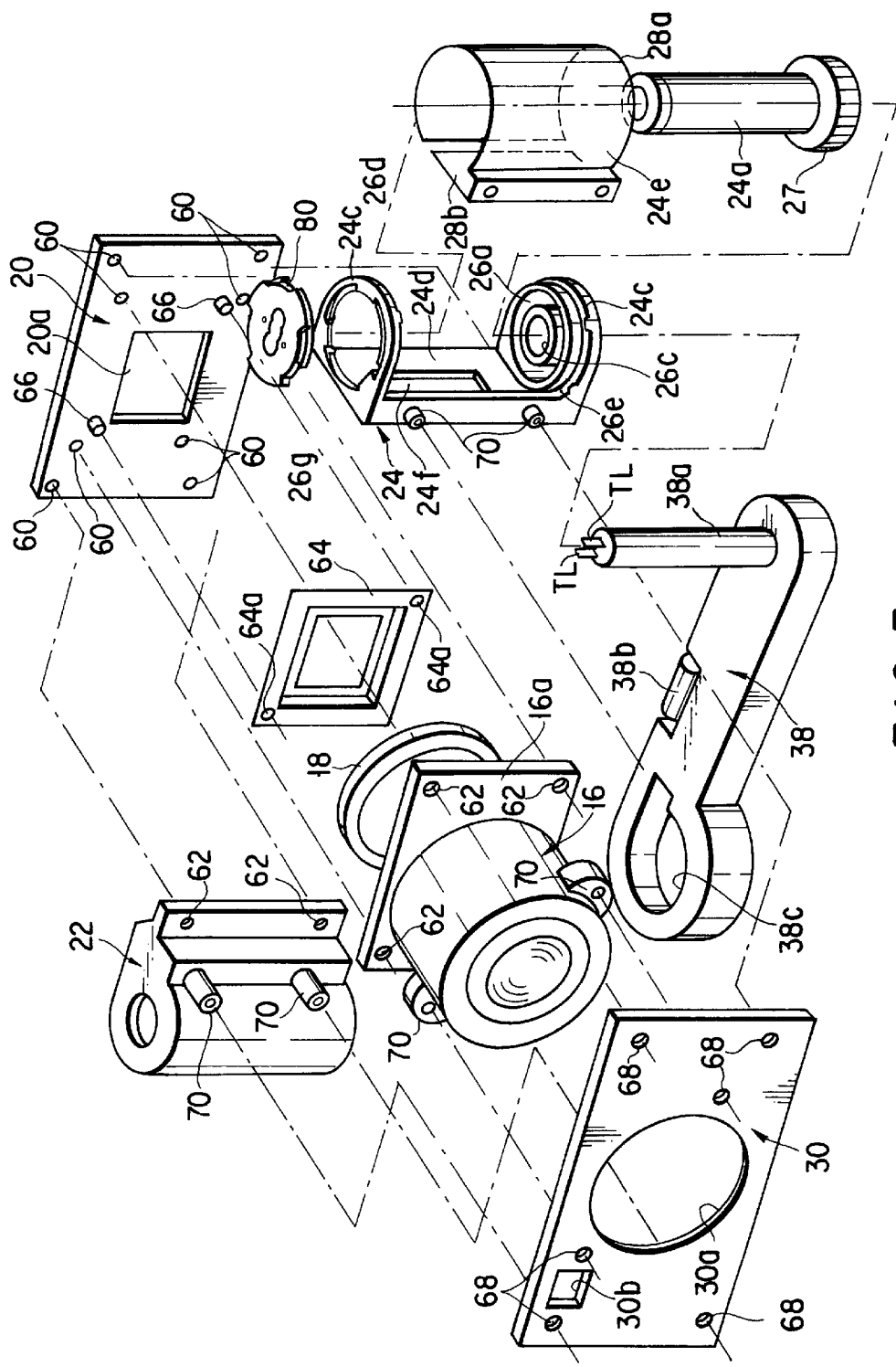
FIG. 3 is an exploded perspective view schematically showing inner structure of the camera shown in FIG. 1, the inner structure including the spool case unit, when viewed obliquely from above and front on a left-hand side.

FIG. 3 illustrates how the lens barrel unit 16, the film cartridge unit 22 and the spool unit 24 are mounted to the rail plate unit 20 with one-dot chain lines. These mounting are reformed by screwing a plurality of screws (not shown) inserted in a plurality of predetermined through holes 60 formed at a plurality of predetermined positions of the rail plate unit 20, into a plurality of predetermined through holes 62 made at a plurality of predetermined positions of each of the lens barrel support plate 16a of the lens barrel unit 16, the film cartridge unit 22 and the spool unit 24. During these mounting operations, positionings of the lens barrel unit 16, the film cartridge unit 22 and the spool unit 24 to the rail plate unit 20 are performed by mating positioning holes (not shown) and/or positioning projections (not shown) formed at a plurality of predetermined positions of each of the lens barrel unit 16, the film cartridge unit 22 and the spool unit 24 with positioning holes (not shown) and/or positioning projections (not shown) formed at a plurality of predetermined positions of the rail plate unit 20.

FIG. 3 further illustrates the mask plate unit 64 which is a picture size defining gate provided in the picture size defining window 20a of the rail plate unit 20. The mask plate unit 64 is positioned in the picture size defining window 20a by fitting positioning holes 64a formed at a plurality of predetermined positions of the mask plate unit 64 onto positioning pins 66 formed at a plurality of predetermined positions of the front surface of the rail plate unit 20. The mask plate unit 64 is sandwiched between the lens barrel support plate 16a at the proximal end of the lens barrel unit 16 and the rail plate unit 20 when the lens barrel support plate 16a is mounted onto the rail plate unit 20 with the ring-shaped light shielding member 18 interposed therebetween, as described before.

FIG. 3 furthermore illustrates how the lens barrel unit 16, the film cartridge unit 22 and the spool unit 24 are mounted to the reinforcement plate unit 30 with one-dot chain lines. These mounting is performed by screwing a plurality of screws (not shown) inserted in a plurality of predetermined through holes 68 formed at a plurality of predetermined positions of the reinforcement plate unit 30, into a plurality of predetermined through holes 70 made at a plurality of predetermined positions of each of the lens barrel unit 16, the film cartridge unit 22 and the spool unit 24.

FIG. 3 furthermore illustrates a film cartridge housing through hole 38c formed in the motor drive unit 38. The film cartridge housing through hole 38c corresponds to a film cartridge case lower opening (not shown) formed in the lower surface of the film cartridge unit 22 when the lens barrel unit 16, the film cartridge unit 22 and the spool unit 24, these units 16, 22 and 24 being mounted onto both of the rail plate unit 20 and the reinforcement plate unit 30 as described above, are placed on the motor drive unit 38, and the through hole 38c constitutes the lower end portion of the film cartridge case. The film cartridge housing through hole 38c corresponds to a film cartridge load/unload lid (not shown) formed on the lower surface of the back cover unit 10b (see FIG. 1), when the motor drive unit 38 and the above described other various units are assembled together and then the motor drive unit 38 units and the above described other units are covered by the front cover unit 10a (see FIG. 1) and the back cover unit 10b (see FIG. 1).

FIG. 3 also shows how the motor 38a of the motor drive unit 38 is inserted into the central hole of the spool shaft 24a arranged between the pair of the end walls 24c of the spool unit 24 by one-dot chain lines.

Figure 4B:
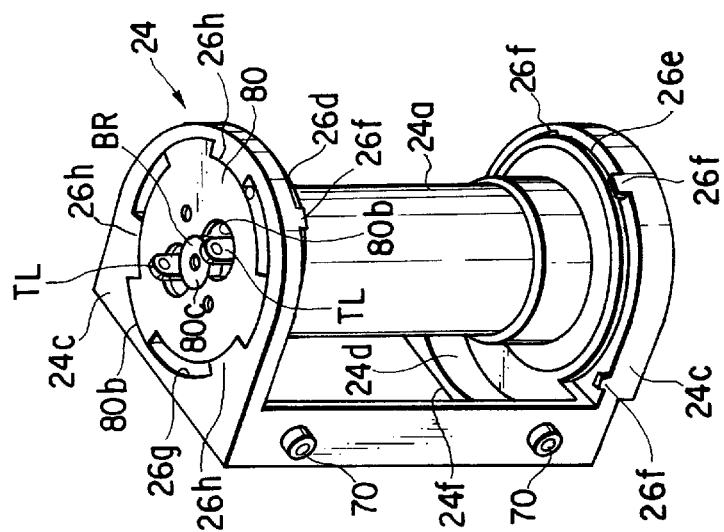
FIG. 4B is a perspective view showing the spool case unit shown in FIG. 4A, in an assembly state, wherein a motor of a driving unit of the camera is housed in a central hole of the spool shaft.
Figure 4A:
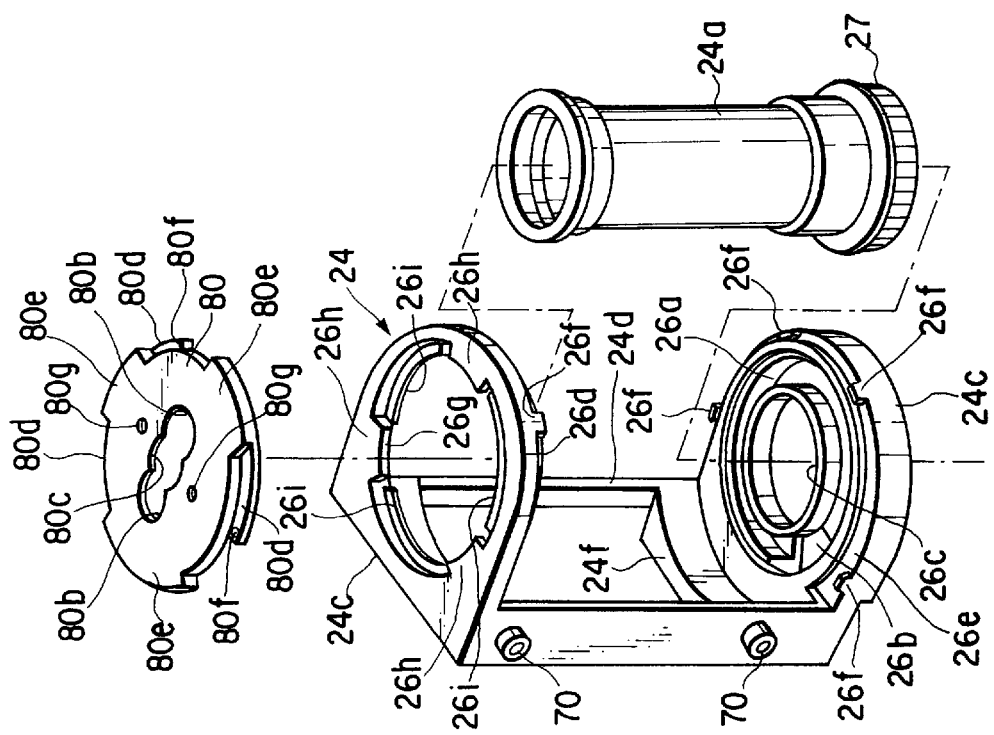
FIG. 4A is an exploded perspective view schematically showing the spool case unit of the camera shown in FIG. 1, wherein an elastic thin plate which surrounds the spool shaft is omitted in order to clear the illustration of the figure.
Figure 5:
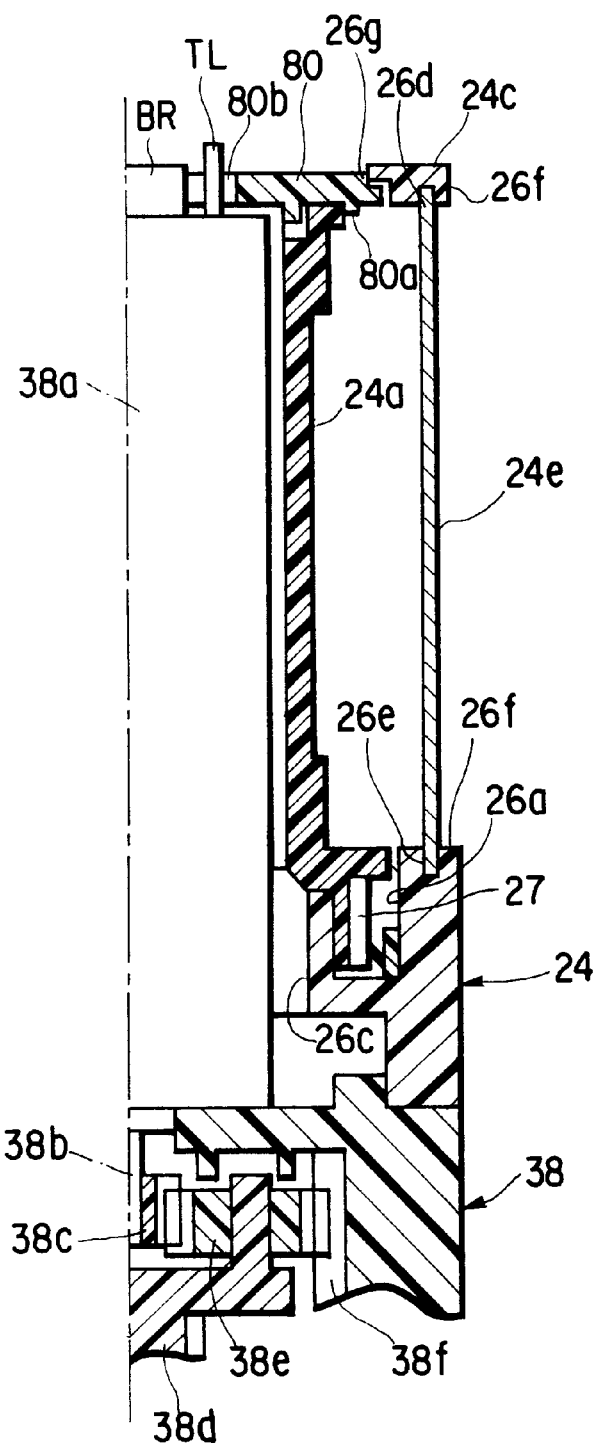
FIG. 5 is a vertical cross sectional view schematically showing the spool case unit of the camera shown in FIG. 1 and the driving unit being combined with each other.

As shown in FIG. 5, an annular bearing groove 80a for rotatably supporting the upper end of the spool shaft 24a is formed in the lower surface of the open/close lid 80 of the upper end wall 24c. As can be seen in FIGS. 3, 4A and 5, an external gear 27 is formed at the lower end portion of the outer circumferential surface of the spool shaft 24a. The external gear 27 is sit in the annular bearing groove 26a formed in the upper surface of the lower end wall 24c of the spool unit 24.

The spool shaft 24a between the pair of end walls 24c of the spool is supported to be rotatable in the spool case of the spool unit 24 as the upper and lower ends thereof are rotatably supported by the bearing groove 80a formed in the lower surface of the open/close lid 80 of the upper end wall 24c and the bearing groove 26a formed in the upper surface of the lower end wall 24c.

A through hole 26b (FIG. 4A) is formed in a part of the bearing groove 26a of the lower end wall 24a. When the spool unit 24 is combined with the motor drive unit 38, a power transmission gear (not shown) projecting upward from the upper surface of the motor drive unit 38 is inserted into the through hole 26b, and the power transmission gear is in mesh with the external gear 27 of the spool shaft 24a.

A central opening 26c is formed at the center of the bearing groove 26a in the lower end wall 24c, the central opening 26c serves to introduce the motor 38a of the motor drive unit 38 into the central hole when the spool unit 24 is assembled with the motor drive unit 38.

In the open/close lid 80 of the upper end wall 24c, a pair of terminal insertion openings 80b and a bearing insertion opening 80c are formed, and into these openings 80b and 80c a pair of terminals TL and a bearing BR of the upper end surface of the motor 38a introduced into the central hole of the spool shaft 24a are to be inserted. FIG. 4B illustrates the pair of the terminals TL and the bearing BR of the upper end surface of the motor 38a when these terminals TL and bearing BR are inserted into the pair of the terminal insertion openings 80b and the bearing insertion opening 80c of the open/close lid 80.

FIG. 5 schematically shows the structure of a part of the rotational force transmission means including the gear train to which the rotational force is transmitted from the output shaft 38b of the motor 38a in the motor drive unit 38. FIG. 5 illustrates an output gear 38c fixed to the output shaft 38b of the motor 38a, a planetary gear support member 38d swingably provided in the motor drive unit 38, a planetary gear 38e rotatably supported on the planetary gear support member 38d, and an internal gear 38f provided in the motor drive unit 38 and meshing with the planetary gear 38e.

The rotational force transmission means serves to transmit the rotational force selectively to a power transmission gear (not shown) meshed with the external gear 27 of the spool shaft 24a by the plunger-solenoid assembly 38b of the motor drive unit 38, and with this structure, the film FL (FIG. 2) can be wound up onto the outer circumferential surface of the spool shaft 24a.

In the lower surface of the upper end wall 24c, a partially ring-shaped notch 26d is formed except for the connecting portion with the connecting member 24d. The notch 26 has a diameter larger than that of the bearing groove 80a of the open/close lid 80 and is arranged coaxially to the bearing groove 80a. Further, in the upper surface of the lower end wall 24c, a partially ring-shaped notch 26e is formed except for the connecting portion with the connecting member 24d. The notch 26e has a diameter larger than that of the bearing groove 26a and is arranged coaxially in the bearing groove 26a. The ring-shaped notch 26d of the upper end wall 24c and the ring-shaped notch 26e of the lower end wall 24c have the same diameter as each other, and are arranged coaxially with each other. On each of the upper and lower ring-shaped notches 26d and 26e, engagement projections 26f are formed at a plurality of positions along the circumferential direction of each thereof.

The thin plate 24e which cooperates with the connecting member 24d to surround the spool shaft 24a together with the junction member 24d between the pair of the end walls 24c can be made of a metal or a synthetic resin having a light shielding property, and it preferably has a conductivity. In this embodiment, the thin plate 24e is made of a steel plate.

The thin plate 24e has a curved portion 28a (FIG. 3) having a diameter smaller than that of each of the upper and lower ring-shaped notches 26d and 26e of the pair of the end walls 24c, and a plane portion 28c (FIG. 3) flattened to be along the connecting member 24d arranged adjacent to the lens barrel unit 16.

The both upper and lower edges of the curved portion 28a of the thin plate 24e can be moved over the engagement projections 26f of the upper and lower ring-shaped notches 26d and 26e of the pair of the end walls 24c while the paired end walls 24c are forced to widen the distance therebetween within the limit of their elasticity in the upper and lower direction. Then, the paired end walls 24c are returned to their original positions by their elasticity so that the both upper and lower edges of the curved portion 28a of the thin plate 24e are held in the upper end lower ring-shaped notches 26d and 26d by the engagement projections. At the same time, the upper and lower edges of the curved portion 28a hold the circumferential surfaces the upper and lower ring-shaped notches 26d and 26e in the radial direction of the each of the notches by the elasticity of the curved portion 28a. During this period, the plane portion 28d of the thin plate 24e is placed to be along the outer side surface of the connecting member 24d by the elasticity of the plane portion.

The thin plate 24e is arranged at a predetermined position between the pair of the end walls 24c, that is, a position at which the upper and lower edges of the curved portion 28a mate with the upper and lower ring-shaped notches 26d and 26e and the plane portion 28d is placed along the outer side surface of the connecting member 24d, only by the holding with the elastic force and the engagement with the engagement projections 26f. Therefore, the thin plate 24e can be easily mounted to a predetermined position of the spool unit 24, more specifically, the predetermined position between the paired end walls 24c.

Since the pair of the end walls 24c are connected to each other by only the connecting member 24d located adjacent to the lens barrel unit 16, it is possible to elastically move portions of the end walls, the portions being located away from the lens barrel unit 16, such that they are approached to or moved away from each other. Further, since the thin plate 24e has an elasticity, it is possible to mount the thin plate 24e surely at the predetermined position between the pair of the end walls 24c without increasing of the measurement accuracy of the pair of the end walls 24c or the thin plate 24e.

In this embodiment, the thin plate 24e which cooperates with the connecting member 24d to surround the outer circumferential surface of the spool shaft 24a between the pair of the end walls 24c of the spool unit 24 has a larger area which face the outer circumferential surface of the spool shaft 24a, than that of the connecting member 24d. Therefore, the side wall constituted by the connecting member 24d and the thin plate 24e in the spool unit 24 can be reduced in its external size of a portion corresponding to the thin plate 24e.

Further, in this embodiment, since the thin plate 24e has the plane portion 28b, the thickness of the connecting portion 24d of the spool unit 24 can be reduced, and also it is possible to form a lightning indent or hole in the connecting portion 24d. As a result, the reduction in the weight of the spool unit 24 can be further promoted. Further, when the lightening region of the connecting portion 24d is formed as an opening 24f facing the outer circumferential surface of the adjacent lens barrel unit 16, the connecting portion 24d, in other words, the spool unit 24, can be arranged more near to the lens barrel unit 16, and therefore the outer size of the camera can be further reduced.

When the thin plate 24e is made of a metal having elasticity or a synthetic resin having elasticity and light shielding property, as well as electrical conductivity, the thin plate 24e be preferably grounded when the spool unit 24 is combined with the other various units of the camera. Such a grounding as described above is performed by connecting the thin plate 24e to a grounding circuit (not shown) of the flexible plate unit 40 (FIG. 1). Since the thin plate 24e is grounded, static electricity which may be generated by the friction of the film FL introduced to the spool case, can be discharged from the thin plate 24e. Therefore, the attachment of dusts to the film FL or various structural elements including the spool unit 24, which is caused by static electricity accumulated on the film FL or various structural elements, can be prevented, and thus the film is not damaged due to the dusts.

The open/close lid 80 of the upper end wall 24c is releasably engaged with the opening 26g formed in the upper end wall 24c. The opening 26g has a diameter which is larger than that of the upper end of the spool shaft 24a but smaller than that of the external gear 27 at the lower end portion.

On the inner circumferential surface of the opening 26g, engagement projections 26h which inwardly project in the opening 26g are formed at a plurality of positions along the upper edge of the inner circumferential surface, and support projections 26i which inwardly project in the opening 26g are formed at a plurality of positions not facing the engagement projections 26h on the lower edge of the inner circumferential surface. Click recesses (not shown) are formed at predetermined positions on the lower surfaces of the engagement projections 26h.

The open/close lid 80 has an outer circumferential surface having a diameter substantially the same as that of the opening 26g. On the outer circumferential surface of the open/close lid 80, engagement projections 80d which outwardly project from the outer circumferential surface are formed at a plurality of positions along the lower edge of the outer circumferential surface, and support projections 80e which outwardly project are formed at a plurality of positions not facing the engagement projections 80d in the upper edge of the outer circumferential surface. The number of the engagement projections 80d of the open/close lid 80 corresponds to the number of the engagement projections 26h of the opening 26g of the upper end wall 24c. Click projections 80f are formed at predetermined positions of the upper surfaces of the engagement projections 80d.

On the upper surface of the open/close lid 80, a pair of tool engagement holes 80g are formed. The engagement holes 80g are used to receive a certain tool (not shown) for rotating the open/close lid 80.

When the certain tool (not shown) is inserted into the pair of the tool engagement holes 80g on the upper surface of the open/close lid 80 and the open/close lid 80 is rotated in a predetermined direction after the support projections 80e are placed on the support projections 26h of the opening 26g, the engagement projections 80d of the open/close lid 80 can be located under the engagement projections 26h of the opening 26g so that the projections 80d and the projections 26h are overlapped with each other. In this overlapping, the open/close lid 80 can be engaged with the opening 26g in a direction along the longitudinal center line of the spool shaft 24a. The overlapping makes the click projections 80f on the upper surfaces of the engagement projections of the open/close lid 80 a click engagement with the click recesses (not shown) in the lower surfaces of the engagement projections 26h. The click engagement maintains the overlapping, that is, the engagement of the open/close lid 80 to the opening 26g in the direction along the longitudinal center line of the spool shaft 24a, unless the open/close lid 80 is rotated in an opposite direction to the above predetermined direction by the certain tool (not shown).

The combination between such engagement projections 26h of the opening 26 and such engagement projections 80d of the open/close lid 80 is well-known as a so-called bayonet joint structure.

In order to assemble the spool unit 24, the upper end of the spool shaft 24a is inserted into the opening 26g of the upper end wall 24c from the under side of the upper end wall 24c through the space between the pair of the end walls 24c while the spool shaft 24a is inclined, before the open/close lid 80 is engaged with the opening 26g and before the thin plate 24e is arranged at the predetermined position between the pair end plates 24c. Next, the external gear 27 of the lower end portion of the spool shaft 24a is introduced into the space between the pair of the end walls 24c, and the spool shaft 24a is moved down so that the external gear 27 is placed in the bearing groove 26a of the lower end wall 24c. Lastly, by engaging the open/close lid 80 with the opening 26g of the upper end wall 24c, the upper end of the spool shaft 24a and the external gear 27 at the lower end thereof can be rotatably supported by the bearing groove 80a in the lower surface of the open/close lid 80 of the upper end wall 24c and the bearing groove 26a in the upper surface of the lower end wall 24c between the pair of the end walls 24c.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A spool case unit for a camera having a lens barrel and using a long and narrow film, which is located adjacent to the lens barrel of the camera, and which houses a spool shaft for winding up the long and narrow film, said spool case unit comprising:

a pair of end walls respectively arranged at end sides of the film located in a width direction of the film wound onto the spool shaft, so as to face each other in a direction along a center line of rotation of the spool shaft, each of said pair of end walls having an engagement recess in each surface of said end walls, each of the engagement recesses being situated on an outer side of a maximum outer diameter of the wound film and extending along an outer circumferential surface of the wound film;

a connecting member integrated with a part of each of said pair of end walls, the part being situated on an outer side of the maximum outer diameter of the film wound onto the spool shaft, extending between the parts of said pair of end walls, and connecting the parts of said pair of end walls to each other; and an elastic thin plate having a light shielding property and an elasticity, which constitutes a curved surface having a radius smaller than that of the engagement recess in a free state with respect to a center line of rotation of the spool shaft, and both ends of which in its width direction orthogonal to a circumferential direction of the curved surface are engaged with the engagement recesses while both ends of said elastic thin plate applies an elastic force to the engagement recesses from outside in the radial direction with respect to the center line of rotation of the spool shaft, as said pair of end walls are moved away from each other and said curved surface being elastically deformed to increase its diameter, thereby constituting a side wall surrounding a circumferential surface of the spool shaft by cooperating with said connecting member except for a film path for loading/unloading the film between said pair of end walls, thus defining a spool chamber for housing the spool shaft within the side wall.

2. A spool case unit for a camera, according to claim 1, wherein:

the camera includes a grounded circuit; and said elastic thin plate has a conductivity and is electrically connected to the grounded circuit, for releasing static electricity generated by the film loaded to/unloaded from the spool case to the grounded circuit.

3. A spool case unit for a camera having a lens barrel and using a long and narrow film, which is located adjacent to the lens barrel of the camera, and which houses a spool shaft for winding up the long and narrow film, said spool case unit comprising:

a pair of end walls respectively arranged in both end sides of the film located in a width direction of the film wound onto the spool shaft, so as to face each other in a direction along a center line of rotation of the spool shaft, each of said pair of end walls having an engagement recess in each surface of said end walls, each of the engagement recesses being situated on an outer side of a maximum outer diameter of the wound film and extending along an outer circumferential surface of the wound film;

a plurality of engagement projections formed on each of said pair of end walls along the engagement recess in an outer side of the engagement recess in the radial direction of the spool shaft;

a connecting member integrated with a part of each of said pair of end walls, the part being situated on an outer side of the maximum outer diameter of the film wound onto the spool shaft, extending between the parts of said pair of end walls, and connecting the parts of said pair of end walls to each other; and an elastic thin plate having a light shielding property, an elasticity, and both ends being located in a direction along a center line of rotation of the spool shaft, the both ends of the elastic thin plate being engaged with the engagement recesses and said plurality of engagement projections in the direction along the center line of rotation of the spool shaft and in the radial direction, as said pair of end walls are moved away from each other, thereby constituting a side wall surrounding a circumferential surface of the spool shaft by cooperating with said connecting member except for a film path for loading/unloading the film between said pair of end walls, thus defining a spool chamber for housing the spool shaft within the side wall.

4. A spool case unit for a camera having a lens barrel and being detachably provided with a film cartridge housing a long and narrow film, which is located adjacent to the lens barrel of the camera and which houses a spool shaft for winding up the long and narrow film drawn out of the film cartridge, said spool case unit comprising:

a pair of end walls respectively arranged at end sides of the film located in a width direction of the film wound onto the spool shaft, so as to face each other in a direction along a center line of rotation of the spool shaft, each of said pair of end walls having an engagement recess in each surface of said end walls, each of the engagement recesses being situated on an outer side of a maximum outer diameter of the wound film and extending along an outer circumferential surface of the wound film;

a connecting member integrated with a part of each of said pair of end walls, the part being situated on an outer side of the maximum outer diameter of the film wound onto the spool shaft, extending between the parts of said pair of end walls with the connecting member being located adjacent to the lens barrel, and connecting the parts of said pair of end walls to each other, said connecting member having a flat portion along an optical axis of the lens barrel; and an elastic thin plate having a light shielding property and an elasticity, and including a curved portion and a flat portion continuous to the curved portion in a circumferential direction of the curved portion, both ends of the curved portion being positioned in a width direction orthogonal to the circumferential direction, engaging with the engagement recesses, and the flat portion being arranged along the flat portion of said connecting member, as said pair of end walls are moved away from each other, thereby constituting a side wall surrounding a circumferential surface of the spool shaft by cooperating with said connecting member except for a film path for loading/unloading the film between said pair of end walls, thus defining a spool chamber for housing the spool shaft within the side wall.

5. A spool case unit for a camera, according to claim 4 wherein the curved portion of said elastic thin plate has a radius smaller than that of the engagement recess in a free state with respect to a center line of rotation of the spool shaft, and both ends of the curved portion in the width direction orthogonal to the circumferential direction of the curved portion being engaged with the engagement recesses of said pair of end walls while both ends of said elastic thin plate apply elastic force to the engagement recesses from outside in the radial direction of the center line of rotation of the spool shaft, as said pair of end walls are moved away from each other and said curved portion is elastically deformed to increase its diameter.

6. A spool case unit for a camera, according to claim 4, wherein:

a thin portion or an opening is formed in the flat portion of said connecting member; and the flat portion of said elastic thin plate arranged along the flat portion of said connecting member covers the thin portion or opening formed in the flat portion of said connecting member while said elastic thin plate constituting the side wall surrounding the circumferential surface of the spool shaft by cooperates with said connecting member between said pair of end walls.

7. A spool case unit for a camera, according to claim 4, wherein:

the camera includes a grounded circuit; and said elastic thin plate has a conductivity and is electrically connected to the grounded circuit, for releasing static electricity generated by the film loaded to/unloaded from the spool case to the grounded circuit.

* * * * *